3,847,933
ACID CATALYZED ALKYLATION OF
HYDANTOIN
William E. Tyler III, Berkeley Heights, N.J., assignor to
Esso Research and Engineering Company
No Drawing. Continuation-in-part of abandoned application Ser. No. 96,643, Dec. 9, 1970. This application Sept. 18, 1972, Ser. No. 289,866
Int. Cl. C07d 49/32
U.S. Cl. 260—309.5       7 Claims

ABSTRACT OF THE DISCLOSURE

Novel products are secured by the alkylation of compounds selected from the group consisting of hydantoins having the general formula:

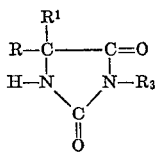

wherein R and $R_1$ are selected from the group consisting of hydrogen, lower alkyl, benzyl and phenyl radicals and $R_3$ is selected from the group consisting of hydrogen, lower alkyl and phenyl radicals with olefins in the presence of a strong acid. The alkylation occurs at the 1-position, yielding intermediates which may be converted to α-amino acids by subsequent hydrolysis.

CROSS REFERENCE TO RELATED APPLICATION

The instant application is a continuation-in-part of U.S. Ser. No. 96,643, filed on Dec. 9, 1970, in the name of W. E. Tyler III and now abandoned.

FIELD OF THE INVENTION

Novel products are secured by the alkylation of compounds selected from the group consisting of hydantoins having the general formula:

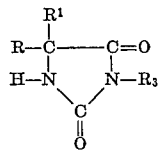

wherein R and $R_1$ are selected from the group consisting of hydrogen, lower alkyl, benzyl and phenyl radicals and $R_3$ is selected from the group consisting of hydrogen, lower alkyl and phenyl radicals with olefins in the presence of a strong acid. The alkylation occurs at the 1-position, yielding intermediates which may be converted to α-amino acids by subsequent hydrolysis.

DESCRIPTION OF THE PRIOR ART

It has been recognized in the art that an alkylated hydantoin may be used as an additive in many substances such as in medical formulations, herbicides and the like.

U.S. Pat. 3,134,663 teaches a method for the preparation of 1,3 substituted hydantoins. All of the 1,3 substituted hydantoins taught by the patentee are substituted in the 3-position with an aryl or substituted aryl group, unlike the novel compounds produced by the instant process.

U.S. Pat. 3,395,153 teaches a method for the preparation of 3,5 dialkyl hydantoins which are useful starting materials for the preparation of the novel 1,3,5 substituted hydantoins disclosed hereinbelow.

However, there is no teaching in the patent which would enable the skilled artisan to prepare 1,3,5 substituted derivatives of hydantoin from the 3,5 dialkyl hydantoin compounds disclosed therein.

SUMMARY OF THE INVENTION

Thus, in accordance with the present invention, an olefin is reacted with a hydantoin in the presence of a strong acid to produce an alkylated hydantoin. A typical reaction is as follows:

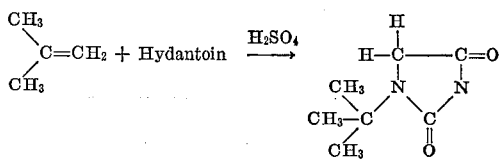

$C_1$–$C_{30}$ alkyl, aryl, alkaryl and/or aralkyl groups may be substituted for H on the 5-position, and the position 3 may be substituted with $C_1$ to $C_{30}$ alkyl or alkaryl groups.

Suitable olefins for use in the present process are, for example, propene, butene-1, alkene-1, $$CH_3—(CH_2)_{2-10}—CH=CH_2,$$

3-methylbutene-1, 3,3-dimethylbutene-1, butene-2, bicyclo [2,2,1] heptene-2, isobutene, 2-methyl-2-butene, and 2,3-dimethyl-2-butene.

It is preferred that a nonsubstituted hydantoin be employed, i.e. R, $R_1$ and $R_3$ are hydrogen. However, the hydantoin may contain substitutions at the 3- or 5-positions. Those substitutions may comprise alkyl or aryl groups within the limitations defined above. Generally the number of carbon atoms in the alkyl group may vary from about 1 to 30, the number of carbon atoms in the aryl group from about 6 to 30 and the number of carbon atoms in the alkaryl or aralkyl group may vary from 7 to 30. In general, the substituted hydantoin should have some solubility in the acid utilized. Typical substituted hydantoins which may be alkylated in accordance with the present process are 3-methylhydantoin, 3-ethylhydantoin, 3-benzylhydantoin, 5-methylhydantoin, 5-ethylhydantoin, 5-phenylhydantoin, 5-benzylhydantoin, 3,5-dimethylhydantoin, 3-methyl-5-benzylhydantoin, 3-benzyl-5-methylhydantoin, 5,5-dimethylhydantoin and 5,5-diphenylhydantoin. It is important that no aromatic ring be attached directly at the 3 position, since for some unknown reason this structure hinders the alkylation of the 1 position. Thus, it is preferred that the strong acid be sulfuric acid of a concentration greater than 70%, preferably above 80%. A very desirable concentration is in the range from 98% to 100%. Other strong acids of similar concentrations which can be used are, for example, phosphoric acid, fluorosulfonic, phosphoric acid·$BF_3$, and hydrofluoric acid. Aqueous hydrochloric acid having an acid concentration preferably of at least 6 molal may also be used.

The reaction may be carried out at a temperature in the range of about —75° C. to about +25° C. In general, it is preferred to conduct the reaction at a temperature in the range from about +5° C. to about —40° C., such as about —20° C.

The concentration of the hydantoin in the acid may be varied from about 0.1 molal to about 10 molal. A preferred concentration of the hydantoin in the acid is in the range from about 1 molal to about 5 molal, such as about 3 molal. Sufficient acid should be present to at least partially dissolve the hydantoin and to maintain the reaction mixture in a fluid state.

The reaction mixture should be agitated vigorously and the rate of the incoming olefin, whether it be in the gaseous or liquid state, regulated so that it has an opportunity to react immediately with a hydantoin molecule after having been protonated. The rate at which the olefin may be introduced is dependent to a great extent on the degree of agitation and the reactor design. The limiting factor is how fast the olefin is protonated and reacts with the hydantoin relative to how fast an already protonated olefin reacts with it. It is well within the skill of the artisan familiar with the design of alkylation processes to determine the agitation required to carry out any of the processes described in the instant disclosure. Examination of the table below will serve to demonstrate the importance of the above-mentioned factors.

| Wt. hydantoin (g.) R, R₁ and R₃=H | Wt. 98% H₂SO₄ (g.) | Temp. (° C.) | Rate C₄= (l./hr.) | Time (hr.) | Yield (g.) | Percent |
|---|---|---|---|---|---|---|
| 33 | 132 | −20 | 2.5 | 4 | 51 | 98 |
| 100 | 400 | −20 | 6.0 | 6 | 71 | 45.5 |
| 100 | 400 | −20 | 3.0 | 12 | 105 | 67.3 |

When the charge of hydantoin and acid is relatively small, as in the first example, the stirring is very efficient and the olefin is introduced slowly enough so that the yield is very good. In the second example, when the charge and the rate of olefin introduction are scaled up threefold, the yield drops rather precipitously. The stirring efficiency decreases and the olefin is introduced so fast that considerable polymerization occurs rather than alkylation; when, as in the third example, the rate of olefin introduction is reduced, the yield increases. This is because the concentration of free olefin in the solution is reduced and more time is allowed for its reaction with the hydantoin rather than itself.

The yield of alkylated hydantoin as a function of temperature and acid concentration is shown in the following table. The reaction of hydantoin (0.33 mole) in 98% sulfuric acid (132 g.) at −20° C. with isobutylene (0.42 mole −25 l./hr. in 4 hours) was carried out and worked up, as described in Example 1.

| Temperature, ° C. | Percent H₂SO₄ | Filtered yield of crude product isolated (g.)[1] | Extracted (CHCl₃) |
|---|---|---|---|
| −20 | 98 | 52.7 | 3.5 |
| −20 | 88 | 35.3 | 2.2 |
| −20 | 69 | 29.3 | |
| 0 | 98 | 25.8 | 10.4 |
| 25 | 98 | | 21.1 |
| −78 | 98 | [2] (15.5) | 7.5 |

[1] Weights of crude 1-t-butyl hydantoin obtained as described in Example 1.
[2] Recovered hydantoin.

It is apparent that excellent results are secured at −20° C. with 98% H₂SO₄.

The present invention will be more fully understood by the following examples illustrating the same.

EXAMPLE 1

1-t-Butyl Hydantoin

Hydantoin (33 g., 0.33 mole) was dissolved in 132 g. of 98% sulfuric acid at −20° C. Isobutylene was flowed into the reaction mixture at the rate of 2.5 liters per hour over a period of 4 hours for a total of 0.40 mole. After stirring for an additional hour, 150 ml. of ice and water were added, maintaining the temperature at 0° C. The solids were filtered and dried and the mother liquor was extracted three times with 200 ml. of CHCl₃. After drying, the solvent was stripped to yield a solid. Yields of the 1-t-butyl hydantoin were near quantitative. Recrystallization from benzene-heptane gave white crystals, m.p. 195°–198°.

EXAMPLE 2

1-(2-Methyl-2-Butyl) Hydantoin

Hydantoin (33 g., 0.33 mole) was dissolved in 98% sulfuric acid (132 g.) at −20°. In one experiment, 2-methyl - 1 - butene was added and, in another experiment, 2-methyl - 2 - butene was added (28 g., 0.40 mole) with vigorous stirring. The reactions were stirred at −20° for 1–2 hours and worked up by the addition of 150 ml. of ice and water. This resulting mixture was extracted with three times 150 ml. of CHCl₃. The extracts were combined, dried (MgSO₄), and the solvent stripped to yield 13.3 of white solid. Thin layer chromatography (TCL) and nuclear magnetic resonance (NMR) analysis showed this to be a mixture of 1-t-butyl hydantoin (40%) and 1-t-amyl hydantoin (60%). Pure 1-t-amyl hydantoin was isolated by chromatography on silica gel (Grace 923) employing a linear gradient of CHCl₃ to CH₃CN for elution. The early cuts which proved to be pure 1-t-amyl hydantoin by TLC were combined and recrystallized from benzene-hexane to give a white solid, m.p. 176°–177°.

Analysis.—Calcd. for $C_8H_{14}N_2O_2$: C, 56.45; H, 8.29; N, 16.46. Found: C, 56.57; H, 8.18; N, 16.28.

EXAMPLE 3

1-(2-Methyl-2-Pentyl) Hydantoin

Hydantoin (33 g., 0.33 mole) was dissolved in 98% sulfuric acid (132 g.) at −20°. 2-methyl-1-pentene (31 g., 0.33 mole) was added with vigorous stirring over a period of 2–3 hrs. After the addition was completed, the reaction was stirred at 20° for 1–2 hrs., then worked up by the addition of 150 ml. of ice and water. The solids were filtered and extracted with CHCl₃. The extractions were dried (MgSO₄), and the solvent stripped to yield 5.3 g. of a solid. The aqueous filtrate was extracted with 2×150 ml. of CHCl₃. The extract was dried (MgSO₄), and the solvent stripped to yield 7.0 g. of solids. The two solids were shown by TLC and NMR to be a mixture of 1-t-butyl hydantoin (15%) and 1-(2-methyl - 2 - pentyl) hydantoin (85%) of nearly the same composition. Chromatography on silica gel (Grace 923), eluting with chloroform-acetonitrile (50/50; v./v.) provide a pure sample of the latter in the early cuts. Recrystallization from benzene-hexane gave platelets m.p. 115°–117°.

Analysis.—Calcd. for $C_9H_{16}N_2O_2$: C, 58.67; H, 8.75; N, 15.21. Found: C, 58.26; H, 9.23; N, 14.93.

EXAMPLE 4

1-t-Butyl-5-Methyl Hydantoin

To 5-methyl hydantoin (23 g., 0.20 mole) in 98% sulfuric acid (70 g.) cooled to −20° was added in the gas phase isobutylene (15.2 g., 0.27 mole) over a 3-hour period. The reaction was stirred for one hour longer, then worked up by adding ice and water. The aqueous phase was extracted with 2×150 ml. of CHCl₃, dried (MgSO₄) and the solvent removed to yield 4.6 g. of solid, identified by TLC and NMR as 1-t-butyl - 5 - methyl hydantoin. Recrystallization from benzene-hexane yielded colorless crystal, m.p., 150°–152°. Upon standing 9.1 of solid crystallized from the above aqueous layer; TLC showed this to be a mixture of 1-t-butyl - 5 - methyl hydantoin and 5-methyl hydantoin present in about equal quantities.

Analysis.—Calcd. for $C_8H_{14}N_2O_2$: C, 56.45; H, 8.29; N, 16.46. Found: C, 56.67; H, 9.36; N, 17.35.

EXAMPLE 5

A number of novel alkylated hydantoins were prepared by the methods outlined in the previous examples. The general conditions were: hydantoin to sulfuric acid ratio, 1:3 (w./w.); temperature, −20° C. Workup was accomplished by pouring the reaction mixture into ice and water and either filtering or extracting the products. A list of those hydantoins which were prepared, along with the olefin which was employed is summarized in the following table. Either hydantoin or the appropriate 3- and/or 5-substituted hydantoin was used as starting material.

HYDANTOINS—NEW COMPOSITION OF MATTER

| Hydantoin | M.P., ° C. | Olefin employed |
|---|---|---|
| 1-t-butyl | 195–198 | Isobutylene. |
| 1-(2-methyl-2-butyl) | 176–177 | 2-methyl-1-butene or 2-methyl-2-butene. |
| 1-2(2-methyl-2-pentyl) | 115–117 | 2-methyl-2-pentene. |
| 1-(2,3-dimethyl-2-butyl) | 118–126 | 2,3-dimethyl-2-butene. |
| 1-(3-methyl-3-pentyl) | 161–166 | 2-ethyl-1-butene. |
| 1-(1-methyl cyclopentyl) | 215–215.5 | 1-methyl cyclopentene. |
| 1-(1-methyl cyclohexyl) | 195.5–196.5 | 1-methyl cyclohexene. |
| 1-(1-methyl cycloheptyl) | 154–156 | 1-methyl cycloheptene. |
| 1-(2-bicyclo[2:2:1] heptyl) | 214–215 | Bicyclo[2:2:1] heptane-2. |
| 1-t-butyl-3-methyl | 101–102 | Isobutene. |
| 1-t-butyl-3-ethyl | 56–57 | Do. |
| 1-t-butyl-3-benzyl | 80–81 | Do. |
| 1-t-butyl-5-methyl | 150–152 | Do. |

EXAMPLE 6

1-t-Butyl-3-Phenyl Hydantoin

3-Phenyl Hydantoin was reacted with isobutylene at the conditions described in Example 4. No alkylation at the 1 position occurred. When 3-Benzyl Hydantoin was reacted with isobutylene at similar conditions 1-t-Butyl-3-Benzyl Hydantoin was isolated in good yield. This example thus demonstrates that the attachment of an aromatic ring directly to the 3-position of the hydantoin molecule hinders the alkylation of the 1 position.

Thus, the present invention is concerned with a novel process and with novel products produced by this process, which process comprises the alkylation of hydantoins with an olefin. The number of carbon atoms in the alkyl group at the 1-position is in the range from 2 to 20, preferably in the range from 3 to 8. It is preferred that the substituent group in the 1-position be an alkyl group.

The novel compounds, i.e. the 1-substituted; 1,3-disubstitiuted; 1,5-disubstituted; 1,3,5-trisubstituted and the 1,3,5,5 tetra substituted hydantoins will have the general formula:

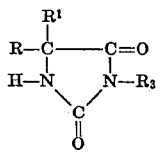

wherein R, $R_1$ and $R_3$ are as defined above and $R_2$ represents the alkyl moiety attached as a result of the alkylation reaction, e.g. a $C_2$ to $C_{20}$ alkyl group, preferably a $C_3$ to $C_8$ tertiary alkyl group. These novel compounds may be used to prepare α-amino acids, particularly the naturally occurring α-amino acids. The novel compounds are converted to α-amino acids by hydrolysis in the presence of an acid or base, according to the general equation:

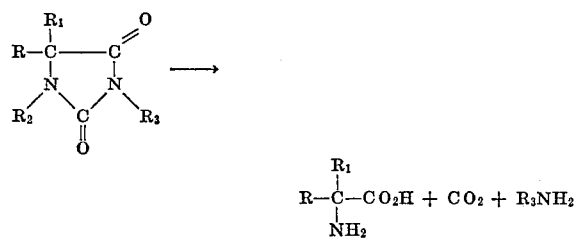

When $R_2$ is the preferred $C_3$ to $C_8$ t-alkyl group then a simple acid hydrolysis wil convert the novel compounds directly into the desired naturally occurring α-amino acid. Hydrolysis in base, must be followed by hydrolysis in acid to remove the tertiary alkyl $R_2$ group. For example, 1-t-butyl-5-methyl hydantoin may be hydrolyzed with aqueous hydrochloric acid at a temperature of from 50 to 200° C. to yield alanine. Similarly to prepare other naturally occurring α-amino acids one may hydrolyze the appropriate novel compound.

When the novel compound is

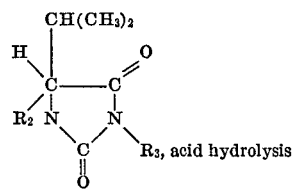

produces valine Hydrolysis of

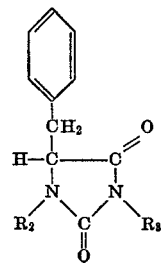

produces phenylalanine.

Typical acids which may be used to hydrolyze the above described novel compounds include sulfuric, phosphoric, alkyl sulfonic, etc. The acid is preferably aqueous and may range in strength from .1 to 10 normal, preferably from 1 to 5 normal. The hydrolysis may be carried out at temperatures of from about 10 to 250° C., preferably from 50° to 200° C. The pressure requirements for the hydrolysis reaction are not critical, for convenience ambient pressure may be used.

What is claimed is:

1. A process for the production of a 1-alkylated hydantoin which comprises reacting an olefin of from 3 to 8 carbon atoms and a hydantoin, said hydantoin having the formula:

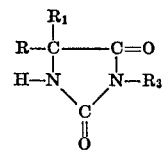

wherein R and $R_1$ are selected from the group consisting of hydrogen, lower alkyl, benzyl and phenyl, and $R_3$ is selected from the group consisting of hydrogen, lower alkyl and benzyl, in the presence of a strong acid selected from the group consisting of sulfuric acid, phosphoric acid, fluorosulfonic acid, phosphoric acid, $BF_3$, hydrofluoric acid and hydrochloric acid, and said acid being present in an amount sufficient to at least partially dissolve said hydantoin and maintain the reaction in a fluid state, at a temperature in the range from about —75° C. to about 25° C.

2. The process of claim 1 wherein said acid is sulfuric acid.

3. The process of claim 2 wherein said acid is of a concentration of at least 70% by weight.

4. The process of claim 1 wherein said olefin is selected from the group consisting of isobutylene, 2-methyl-1-butene, 2-methyl-2-butene, 2-methyl-2-pentene, 2,3-dimethyl-2-pentene, 2-ethyl-1-butene, 1-methyl cyclopentene, 1-methyl cyclohexene, 1-methyl cycloheptene, and bicyclo [2:2:1] heptene-2.

5. The process of claim 1 wherein said olefin is isobutylene.

6. The process of claim 1 wherein R and $R_1$ are hydrogen and $R_3$ is selected from the group consisting of methyl, ethyl and benzyl radicals.

7. The process of claim 1 wherein R and $R_3$ are hydrogen and $R_1$ is selected from the group consisting of methyl, ethyl and benzyl.

References Cited

FOREIGN PATENTS

| | | | |
|---|---|---|---|
| 846,601 | 8/1960 | Great Britain | 260—309.5 |
| 35–13,927 | 9/1960 | Japan | 260—309.5 |
| 38–19,990 | 9/1963 | Japan | 260—309.5 |

OTHER REFERENCES

Long et al., J. Amer. Chem. Soc. vol. 70, pp. 900–903 (1948). QD1.A5.

Ashby et al., Chem. Abst., vol. 70, No. 87548b (1969). QD1.A51.

Biale, Chem. Abst., vol. 73, No. 34776e (1970). QD1.A51.

Patai et al., In; Patai, Ed., The Chemistry of Alkenes, pp. 469–81 relied on New York, Interscience, 1964. QD305.H7.

Rouvier et al., Chem. Abst., vol. 75, No. 48255n (1971). QD1.A51.

Shenhav et al., J. Chem. Soc. (London) B, 1970, pp. 469–76. QD1.C6ab.

Sinnreich et al., Chem. Abst., vol. 69, No. 27155r (1968). QD1.A51.

Uhlmann, Chem. Abst., vol. 60, Col. 13125 (1964). QD1.A51.

Urry, Chem. Abst., vol. 51, Col. 10589 (1957). QD1.A51.

NATALIE TROUSOF, Primary Examiner

U.S. Cl. X.R.

260—518 R, 534 R